(12) United States Patent
Lee

(10) Patent No.: US 10,983,864 B2
(45) Date of Patent: Apr. 20, 2021

(54) MEMORY SYSTEM AND OPERATING METHOD THEREOF

(71) Applicant: SK hynix Inc., Gyeonggi-do (KR)

(72) Inventor: Joo-Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 6 days.

(21) Appl. No.: 16/596,217

(22) Filed: Oct. 8, 2019

(65) Prior Publication Data

US 2020/0167232 A1 May 28, 2020

(30) Foreign Application Priority Data

Nov. 26, 2018 (KR) ......................... 10-2018-0147008

(51) Int. Cl.
| | |
|---|---|
| *G06F 11/14* | (2006.01) |
| *G06F 11/07* | (2006.01) |
| *G06F 11/10* | (2006.01) |
| *G06F 12/02* | (2006.01) |
| *G06F 12/0882* | (2016.01) |

(52) U.S. Cl.
CPC ........ *G06F 11/1417* (2013.01); *G06F 11/076* (2013.01); *G06F 11/1004* (2013.01); *G06F 11/1016* (2013.01); *G06F 12/0246* (2013.01); *G06F 12/0253* (2013.01); *G06F 12/0882* (2013.01)

(58) Field of Classification Search
None
See application file for complete search history.

(56) References Cited

U.S. PATENT DOCUMENTS

| | | | |
|---|---|---|---|
| 10,592,157 B2* | 3/2020 | Lin | ....................... G06F 3/0619 |
| 10,719,254 B2* | 7/2020 | Lin | ....................... G06F 3/0619 |
| 2020/0125488 A1* | 4/2020 | Byun | ...................... G06F 12/10 |

FOREIGN PATENT DOCUMENTS

| | | |
|---|---|---|
| KR | 10-2015-0125672 | 11/2015 |
| KR | 10-2015-0130638 | 11/2015 |

\* cited by examiner

*Primary Examiner* — Phung M Chung
(74) *Attorney, Agent, or Firm* — IP & T Group LLP

(57) ABSTRACT

A method for operating a memory system which includes a memory device and a controller for controlling the memory device, the operating method includes searching one or more open memory blocks included in the memory device, when a booting operation is performed; detecting one or more erase pages included in each of the open memory blocks; checking an erase threshold voltage distribution corresponding to each of the erase pages; counting a number of first bad pages among the erased pages based on the erase threshold voltage distribution; and switching a first open memory block including the first bad pages among the open memory blocks into a first closed memory block when the number of first bad pages is equal to or greater than a first threshold value.

18 Claims, 19 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2018-0147008 filed on Nov. 26, 2018, which is incorporated herein by reference in its entirety.

BACKGROUND

1. Field

Various embodiments relate to a memory system and an operating method thereof and, more particularly, to a memory system and an operating method thereof capable of efficiently managing memory blocks.

2. Discussion of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption, since they have no moving parts, as compared with a hard disk device. Examples of memory systems having such advantages include universal serial bus (USB) memory devices, memory cards having various interfaces, and solid state drives (SSD).

SUMMARY

Various embodiments are directed to a memory system capable of managing bad memory blocks without an additional operation.

In accordance with an embodiment of the present invention, an operating method for a memory system which includes a memory device and a controller for controlling the memory device, the operating method includes: searching one or more open memory blocks included in the memory device, when a booting operation is performed; detecting one or more erase pages included in each of the open memory blocks; checking an erase threshold voltage distribution corresponding to each of the erase pages; counting a number of first bad pages among the erased pages based on the erase threshold voltage distribution; and switching a first open memory block including the first bad pages among the open memory blocks into a first closed memory block when the number of first bad pages is equal to or greater than a first threshold value.

In accordance with an embodiment of the present invention, a memory system includes: a memory device; and a controller suitable for: searching one or more open memory blocks during a booting operation; detecting one or more erase pages included in each of the open memory blocks; checking an erase threshold voltage distribution corresponding to each of the erase pages; counting a number of first bad pages among the erased pages based on the erase threshold voltage distribution; and switching a first open memory block including the first bad pages among the open memory blocks into a first closed memory block when the number of first bad pages is greater than or equal to a first threshold value.

In accordance with another embodiment of the present invention, an operating method of a controller includes: counting, when detecting one or more erased pages included in a memory block of a memory device with read biases respectively corresponding to the erased pages while booting thereof, a number of turned-off cells within each of the erased pages; and controlling the memory device to perform a garbage collection operation to the memory block when a number of bad pages, each of which has a greater number of turned-off cells than a first threshold among the erased pages, is greater than a second threshold.

In accordance with another embodiment of the present invention, an operating method of a controller includes: counting, when detecting one or more programmed pages included in a memory block of a memory device with read biases respectively corresponding to the programmed pages while booting thereof, a number of turned-off cells within each of the programmed pages; and controlling the memory device to perform a garbage collection operation to the memory block when a number of bad pages, each of which has a lesser number of turned-off cells than a third threshold among the programmed pages, is greater than a fourth threshold.

DETAILED DESCRIPTION

Figure 1:
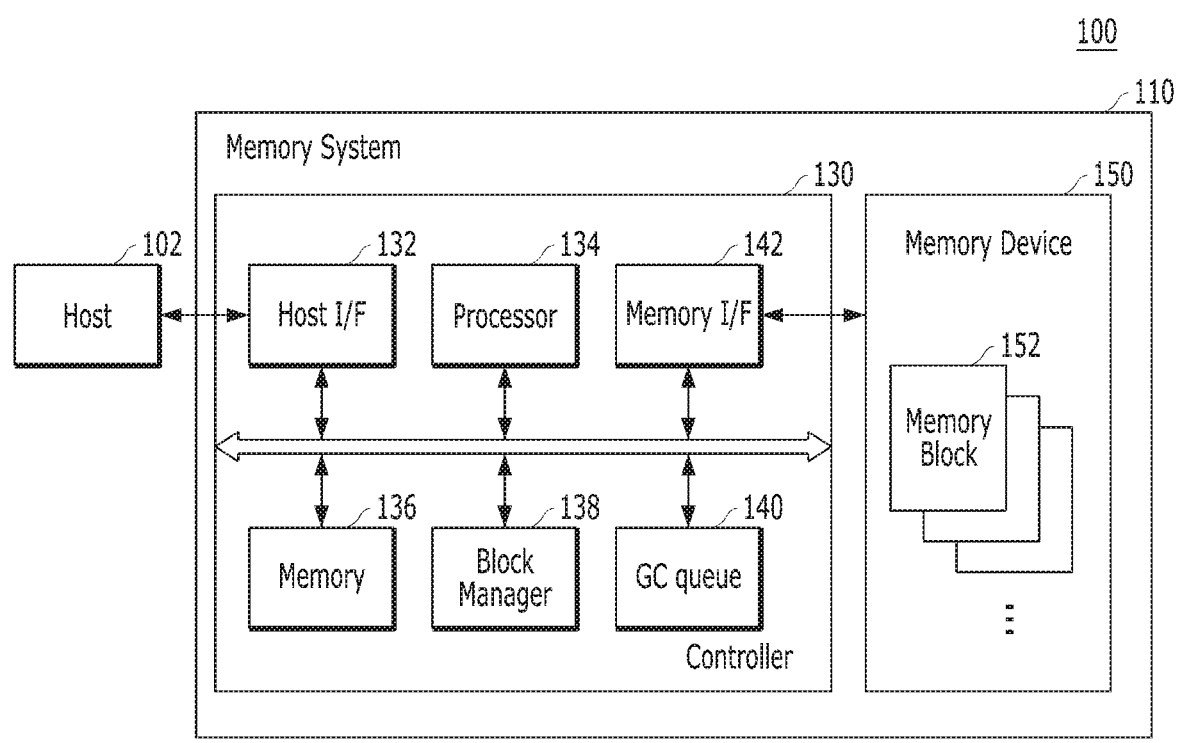
FIG. 1 is a block diagram illustrating a data processing system including a memory system in accordance with an embodiment of the present disclosure.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. The articles 'a' and 'an' as used in this application and the appended claims should generally be construed to mean 'one or more' unless specified otherwise or clear from context to be directed to a singular form. It will be further understood that the terms "comprise", "include", "have", etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The above-described embodiments are merely for the purpose of understanding the technical spirit of the present disclosure and the scope of the present disclosure should not be limited to the above-described embodiments. It will be obvious to those skilled in the art to which the present disclosure pertains that other modifications based on the technical spirit of the present disclosure may be made in addition to the above-described embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system) or a plurality of operating systems. The host 102 may execute an OS to perform an operation corresponding to a user's request on the memory system 110. The host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM) an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 in the memory system 110 may maintain stored data even though power is not supplied. In particular, the memory device 150 in the memory system 110 stores data provided from the host 102, through a write operation, and provides stored data to the host 102, through a read operation. The memory device 150 includes a plurality of memory blocks. Each of the memory blocks includes a plurality of pages. Each of the pages includes a plurality of memory cells to which a plurality of word lines (WL) are coupled. In an embodiment, the memory device 150 may include a plurality of memory dies (not shown), and each memory die may include a plurality of planes (not shown). Each plane may include a plurality of memory blocks, each of which may include a plurality of pages, each of which may include a plurality of memory cells coupled to a word line. In an embodiment, the memory device 150 may be a flash memory having a 3-dimensional (3D) stack structure.

For the structure of the memory device 150 and the 3D stack structure of the memory device 150, detailed descriptions will be made below with reference to FIGS. 2 to 4.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

In detail, the controller 130 includes a host interface 132, a processor 134, a memory interface 142, a memory 136, a block manager 138 and a GC (Garbage Collection) queue 140.

The host interface 132 may process a command and data of the host 102, and may be configured to communicate with the host 102 through at least one among various interface protocols such as USB (universal serial bus), SATA (serial advanced technology attachment), SCSI (small computer system interface) and ESDI (enhanced small disk interface). The host interface 132 may be driven through a firmware referred to as a host interface layer (HIL) being a region which exchanges data with the host 102.

The memory interface 142 serves as a memory/storage interface which performs interfacing between the controller 130 and the memory device 150, to allow the controller 130 to control the memory device 150 in response to a request from the host 102.

The memory 136 as the working memory of the memory system 110 and the controller 130 stores data for driving of the memory system 110 and the controller 130.

The memory 136 may be realized by a volatile memory. For example, the memory 136 may be realized by a static random access memory (SRAM) or a dynamic random access memory (DRAM). Furthermore, the memory 136 may exist inside the controller 130. Alternatively, the memory 136 may exist outside the controller 130, and, when this is the case, may be realized as an external volatile memory to and from which data are inputted and outputted from and to the controller 130 through a memory interface.

The processor 134 may control overall operations of the memory system 110. In particular, the processor 134 may control a program operation or read operation on the memory device 150 in response to a write request or read request from the host 102. The processor 134 may drive firmware referred to as a flash translation layer (FTL), in order to control overall operations of the memory system 110. The processor 134 may be implemented as a microprocessor or a central processing unit (CPU).

In particular, the processor 134 may perform a booting operation of reading a boot code stored in the memory device 150 and driving the FTL, when the memory system 110 is powered on.

The processor 134 may control the memory device 150 to perform a command operation corresponding to a command provided from the host 102. Furthermore, the processor 134 may control the memory device 150 to perform a background operation for the memory device 150. The background operation for the memory device 150 may include a garbage collection (GC) operation, a wear leveling (WL) operation, a map flush operation and the like.

The block manager 138 may manage a plurality of memory blocks 152 included in the memory device 150 under control of the processor 134. In particular, the block manager 138 may intensively manage bad blocks among the plurality of memory blocks 152.

When the booting operation is started by the processor 134, the block manager 138 may search and analyze one or more open memory blocks included in the memory device 150 under control of the processor 134.

Specifically, when the memory system 110 boots on, the block manager 138 may search an open memory block in order to find a page in which data is programmed, among a plurality of pages included in the open memory block.

The block manager 138 may detect one or more erase pages included in the searched open memory block. Furthermore, the block manager 138 may check a threshold voltage distribution (hereafter, referred to as an erase threshold voltage distribution) indicating erase states corresponding to the respective erase pages.

The block manager 138 may determine bad pages based on the erase threshold voltage distribution, and count the number of bad pages.

The block manager 138 may switch the state of a memory block. Specifically, the block manager 138 may switch a target open memory block including a greater number of bad pages than a predetermined threshold value into a closed memory block. For example, the block manager 138 may switch an open memory block having one or more bad pages into a closed memory block.

The block manager 138 may detect one or more program pages included in the searched open memory block. Furthermore, the block manager 138 may check a threshold voltage distribution (hereafter, referred to as a program threshold voltage distribution) indicating program states corresponding to the respective program pages.

The block manager 138 may determine bad pages based on the program threshold voltage distribution, and count the number of bad pages.

The block manager 138 may switch the state of a memory block. Specifically, the block manager 138 may switch a target open memory block including a greater number of bad pages than a predetermined threshold value into a closed memory block. For example, the block manager 138 may switch an open memory block having one or more bad pages into a closed memory block.

The processor 134 may queue information of a closed memory block in a GC queue 140, in order to perform a GC operation on the closed memory block. The GC queue 140 may have a FIFO structure. Therefore, the processor 134 may perform a GC operation on a closed memory block according to the order in which information of the memory block is queued in the GC queue 140.

Furthermore, the processor 134 may queue the information of the switched closed memory block in the GC queue 140 such that the switched closed memory block has a relatively high priority. For example, the processor 134 may queue the information of the switched closed memory block in the GC queue 140 such that a GC operation for the switched closed memory block is performed first. Thus, the processor 134 may first perform the GC operation for the switched closed memory block, even though information of another s memory block is already queued in the GC queue 140.

FIG. 1 illustrates that the block manager 138 and the GC queue 140 in accordance with the present embodiment are configured separately from the processor 134. In another embodiment, however, the processor 134 may include the block manager 138 and the GC queue 140.

While not shown in a drawing, the controller 130 may further include an error correction code (ECC) unit and a power management unit (PMU).

The ECC unit may correct an error bit of data processed in the memory device 150, and may include an ECC encoder and an ECC decoder.

The ECC encoder may perform error-correction encoding on data to be programmed in the memory device 150 and generate data added with parity bits. The data added with parity bits may be stored in the memory device 150. The ECC decoder detects and corrects an error included in data read from the memory device 150, when reading the data stored in the memory device 150.

The ECC unit may perform error correction by using an LDPC (low density parity check) code, a BCH (Bose, Chaudhuri, Hocquenghem) code, a turbo code, a Reed-Solomon code, a convolution code, an RSC (recursive systematic code), TCM (trellis-coded modulation) or BCM (Block coded modulation). However, it is to be noted that the disclosure is not limited thereto. The ECC unit is may include all circuits, modules, systems or devices for error correction.

The PMU may provide and manage power of the memory system 110. That is, the PMU may provide and manage power of the components included in the controller 130 and the memory device 150.

Hereinbelow, a memory device in the memory system in accordance with the embodiment of the disclosure will be described in detail with reference to FIGS. 2 to 4.

Figure 2:
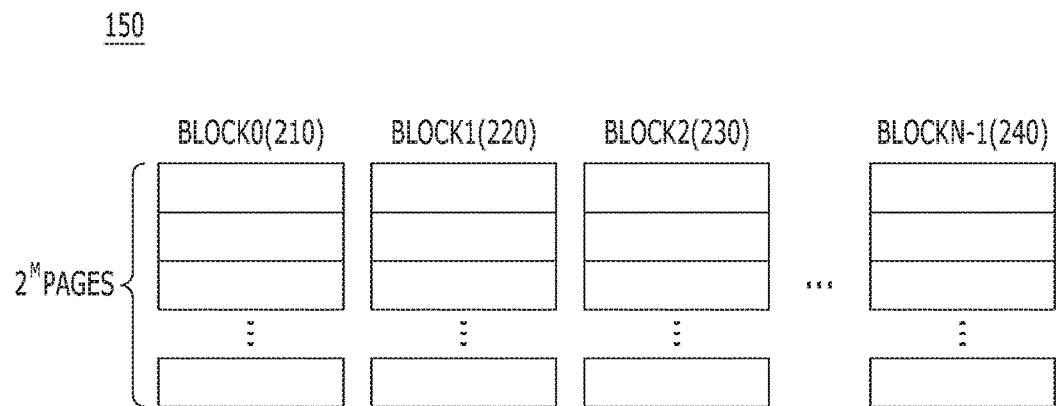
FIG. 2 is a schematic diagram illustrating an exemplary configuration of a memory device employed in the memory system shown in FIG. 1.

FIG. 2 is a schematic diagram illustrating the memory device 150. FIG. 3 is a circuit diagram illustrating an example of a configuration of a memory cell array of a memory block 330 in the memory device 150. FIG. 4 is a schematic diagram illustrating an example of a 3D structure of the memory device 150.

Referring to FIG. 2, the memory device 150 may include a plurality of memory blocks BLOCK0 to BLOCKN−1, where N is an integer greater than 1. Each of the blocks BLOCK0 to BLOCKN−1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN−1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MLC memory blocks. The MLC memory blocks may include a plurality of pages which are embodied by memory cells each storing multi-bit data (for example, 2 or more bits). The MLC memory blocks may generally have greater data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may be implemented by any one of a phase change random access memory (PCRAM), a resistive random access memory (RRAM(ReRAM)), a ferroelectrics random access memory (FRAM), and a spin transfer torque magnetic random access memory (STT-RAM(STT-MRAM)).

The memory blocks 210, 220, 230, 240 may store the data transferred from the host 102 through a program operation, and may transfer data stored therein to the host 102 through a read operation.

Figure 3:
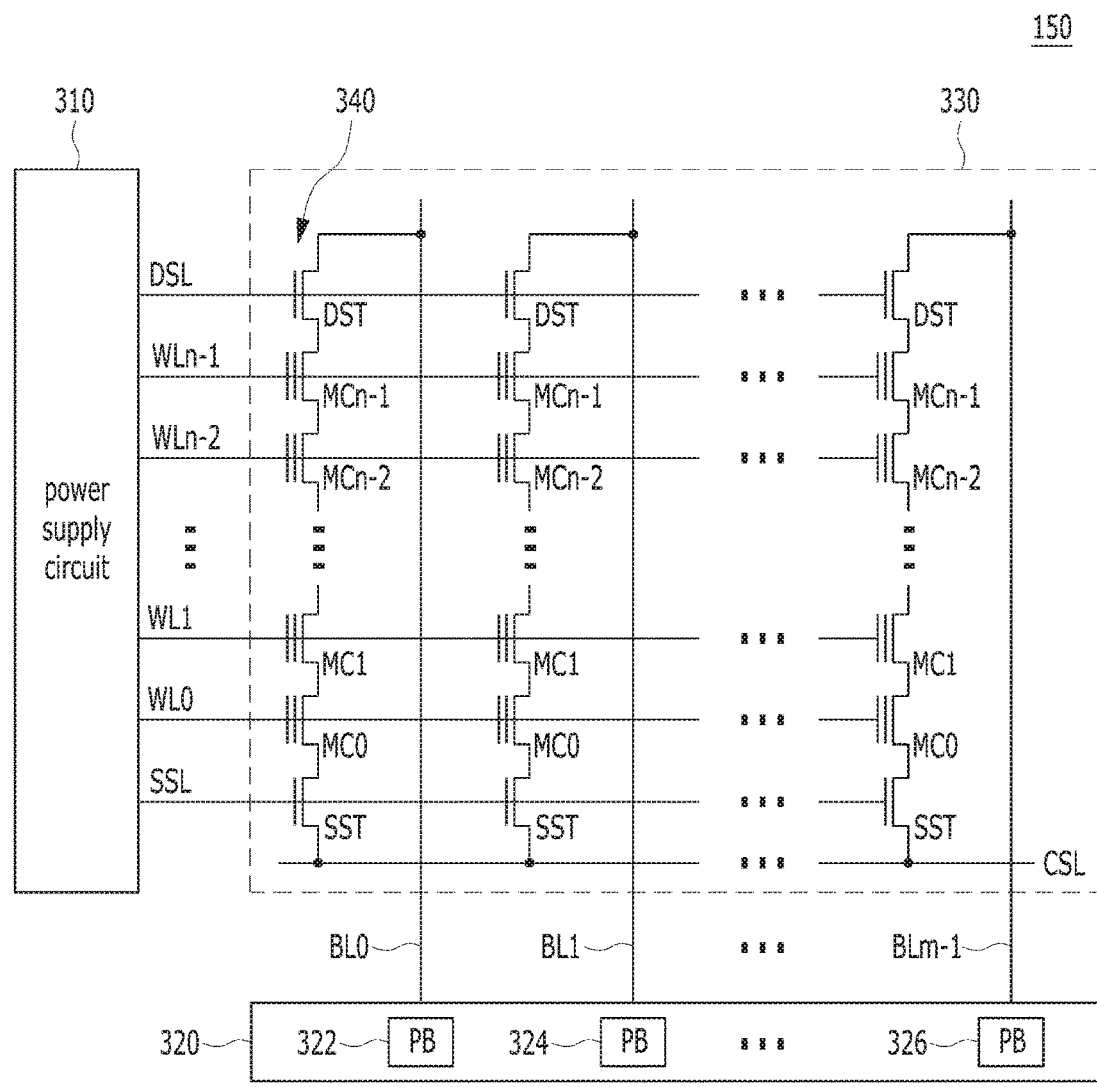
FIG. 3 is a circuit diagram illustrating an exemplary configuration of a memory cell array of a memory block in the memory device shown in FIG. 1.
Figure 4:
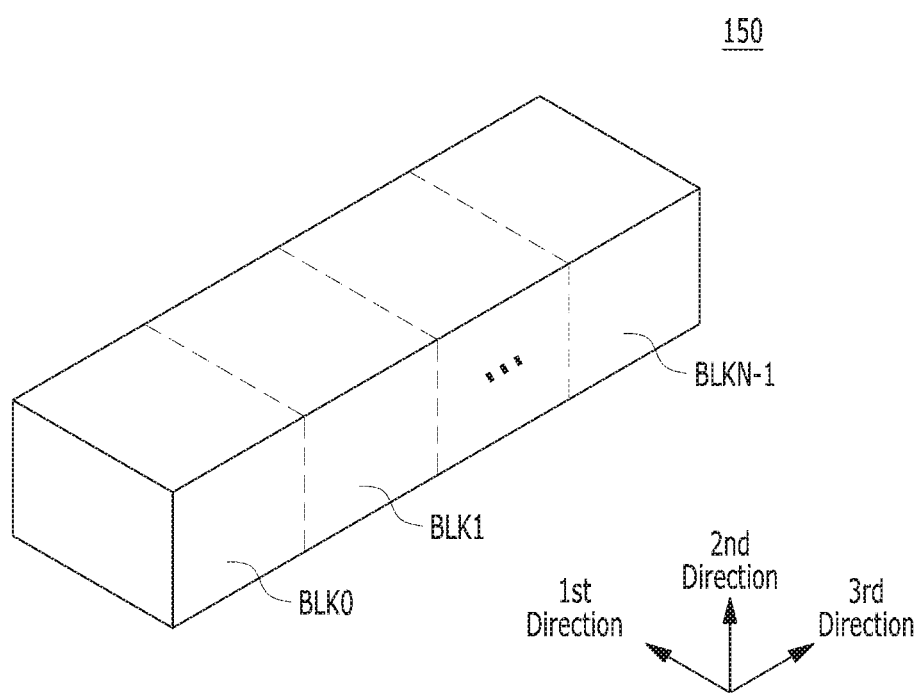
FIG. 4 is a block diagram illustrating a structure of a memory system in accordance with an embodiment of the present invention.

Next, referring to FIG. 3, among the plurality of memory blocks included in the memory device 150 of the memory system 110, each memory block 330 may include a plurality of cell strings 340 which are realized as a memory cell array and are coupled to bit lines BL0 to BLm−1, respectively. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1.

While FIG. 3 shows, as an example, each memory block 330 which is configured by NAND flash memory cells, it is to be noted that each of the plurality of memory blocks included in the memory device 150 in accordance with the embodiment of the disclosure is not limited to a NAND flash memory and may be realized by a NOR flash memory, a hybrid flash memory in which at least two types of memory cells are combined or a one-NAND flash memory in which a controller is built in a memory chip.

A power supply circuit 310 of the memory device 150 may provide word line voltages (for example, a program voltage, a read voltage and a pass voltage) to be supplied to respective word lines depending on an operation mode and a voltage to be supplied to a bulk (for example, a well region) where memory cells are formed. The voltage generating operation of the power supply circuit 310 may be performed under the control of a control circuit (not shown). The power supply circuit 310 may generate a plurality of variable read voltages to generate a plurality of read data, select one among the memory blocks (or sectors) of a memory cell array in response to the control of the control circuit, select one among the word lines of the selected memory block, and provide word line voltages to the selected word line and unselected word lines.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive data to be stored into the memory cell array from a buffer (not illustrated), and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Also, the memory device 150 may be realized as a two-dimensional or three-dimensional memory device. In particular, as shown in FIG. 4, the memory device 150 may be realized as a nonvolatile memory device with a three-dimensional stack structure. In the case where the memory device 150 is realized as a three-dimensional structure, the memory device 150 may include a plurality of memory blocks BLK0 to BLKN−1. FIG. 4 is a block diagram illustrating the memory blocks of the memory device 150 illustrated in FIG. 1, and each of the memory blocks may be realized as a three-dimensional structure (or a vertical structure). For example, the respective memory blocks may be realized as a three-dimensional structure by including a structure which extends in first to third directions, for example, an x-axis direction, a y-axis direction and a z-axis direction.

Each memory block 330 included in the memory device 150 may include a plurality of NAND strings NS which extend in the second direction. The plurality of NAND strings NS may be provided in the first direction and the third direction. Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

Namely, among the plurality of memory blocks of the memory device 150, each memory block 330 may be coupled to a plurality of bit lines BL, a plurality of string select lines SSL, a plurality of ground select lines GSL, a plurality of word lines WL, a plurality of dummy word lines DWL and a plurality of common source lines CSL, and accordingly, may include a plurality of NAND strings NS. Also, in each memory block 330, a plurality of NAND strings NS may be coupled to one bit line BL, and thereby, a plurality of transistors may be realized in one NAND string NS. The string select transistor SST of each NAND string NS may be coupled with a corresponding bit line BL, and the ground select transistor GST of each NAND string NS may be coupled with the common source line CSL. Memory cells MC may be provided between the string select transistor SST and the ground select transistor GST of each NAND string NS. Namely, in each memory block 330 of the plurality of memory blocks of the memory device 150, a plurality of memory cells may be realized.

Figure 5:
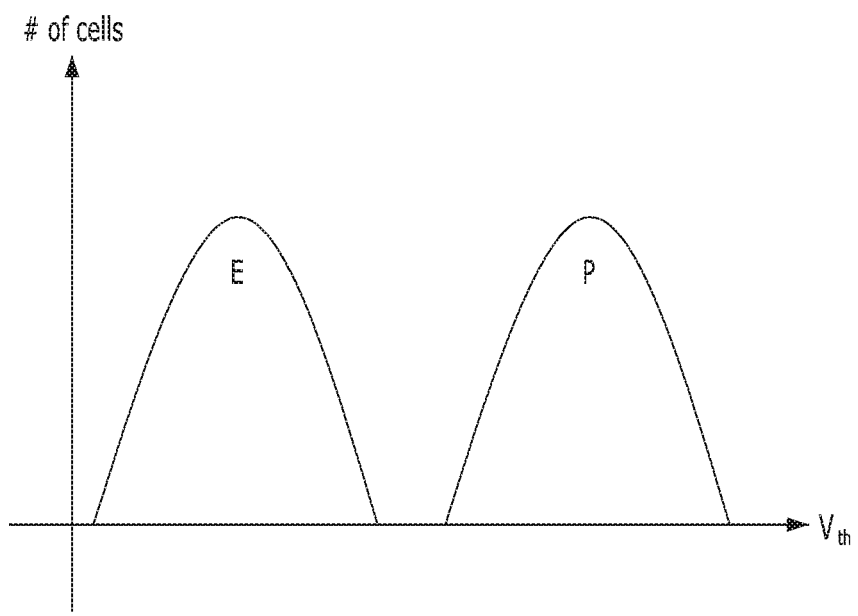
FIG. 5 is a graph illustrating ideal threshold voltage distributions indicating a program state and an erase state of a single level cell (SLC) memory device.

FIG. 5 is a graph illustrating ideal threshold voltage distributions indicating a program state and an erase state of a single level cell (SLC) memory device.

When one bit is programmed to a single memory cell of the SLC memory device, for example, an SLC flash memory, any one of two threshold voltage distributions may be formed in the memory cell.

Due to slight differences in electrical characteristic among a plurality of memory cells, the threshold voltages of memory cells to which the same data are programmed may form a predetermined range of threshold voltage distribution. In the case of a 1-bit SLC, one program threshold voltage distribution P and one erase threshold voltage distribution E may be formed as illustrated in FIG. 5. FIG. 5 illustrates ideal threshold voltage distributions which do not overlap each other, and each of the threshold voltage distributions may have a predetermined range of read voltage margin.

Although not illustrated, the same principle may be applied to a TLC nonvolatile memory device. When three bits are programmed to a single memory cell of the TLC nonvolatile memory device, for example, a TLC flash memory, any one of eight threshold voltage distributions may be formed in the memory cell.

In the case of the 3-bit TLC, seven program threshold voltage distributions P and one erase threshold voltage distribution E may be formed.

Hereafter, as an example, the memory device 150 is driven as an SLC memory device. In the following descriptions, only the SLC memory device 150 will be described. However, this is only an example, and the memory system 110 in accordance with the present embodiment may also be applied to a multi-level cell memory device such as an MLC memory device or TLC memory device.

Figure 6:
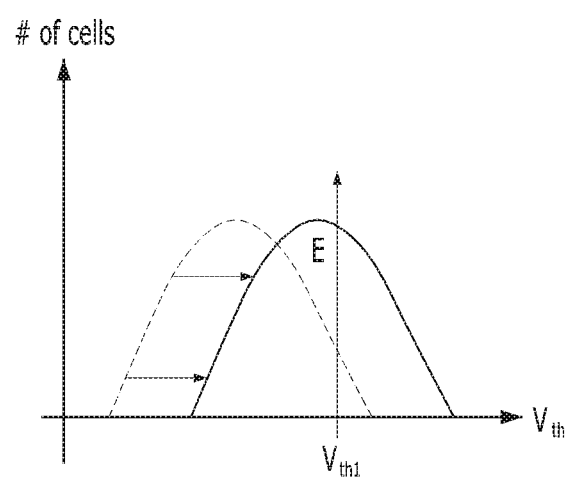
FIG. 6 is a threshold voltage distribution graph indicating an erase threshold voltage distribution which may be deformed by characteristic deterioration of the SLC memory device.

FIG. 6 is a threshold voltage distribution graph indicating an erase threshold voltage distribution which may be deformed by characteristic deterioration of the SLC memory device. Hereafter, as an example, a page in which a number of turned-off cells read by a specific read voltage is greater than '40' is a bad page, when the number of erase operations for a specific page is '2K'.

In an embodiment, program disturbance, erase disturbance and/or back pattern dependency may increase the spread of threshold voltages. As a result, the erase threshold voltage distribution may be shifted to the right as illustrated in FIG. 6.

Referring to FIG. 6, when the processor 134 reads a target page having the ideal erase threshold voltage distribution (dotted line) with a first read voltage $V_{th1}$, memory cells having threshold voltages lower than the first read voltage $V_{th1}$ may be turned-on, and memory cells having threshold voltages equal to or greater than the first read voltage $V_{th1}$ may be turned-off. When the processor 134 reads a target page having an erase threshold voltage distribution (solid line) shifted to the right from the ideal erase threshold voltage distribution due to characteristic deterioration (for example, disturbance) of the memory device 150 with the first read voltage $V_{th1}$, the number of the turned-off cells may increase. When the number of the turned-off cells is greater than or equal to a predetermined threshold value, the block manager 138 may determine that the erase threshold voltage distribution (solid line) is not normal. That is, when the number of the turned-off cells is greater than or equal to the predetermined threshold value, the block manager 138 may determine that the page is a bad page.

For example, when the number of erase operations for the target page is '2K' and the number of the turned-off cells included in the target page read by the first read voltage $V_{th1}$ is greater than '40', the block manager 138 may determine that the target page is a bad page due to the characteristic deterioration of the memory device 150.

Figure 7A:
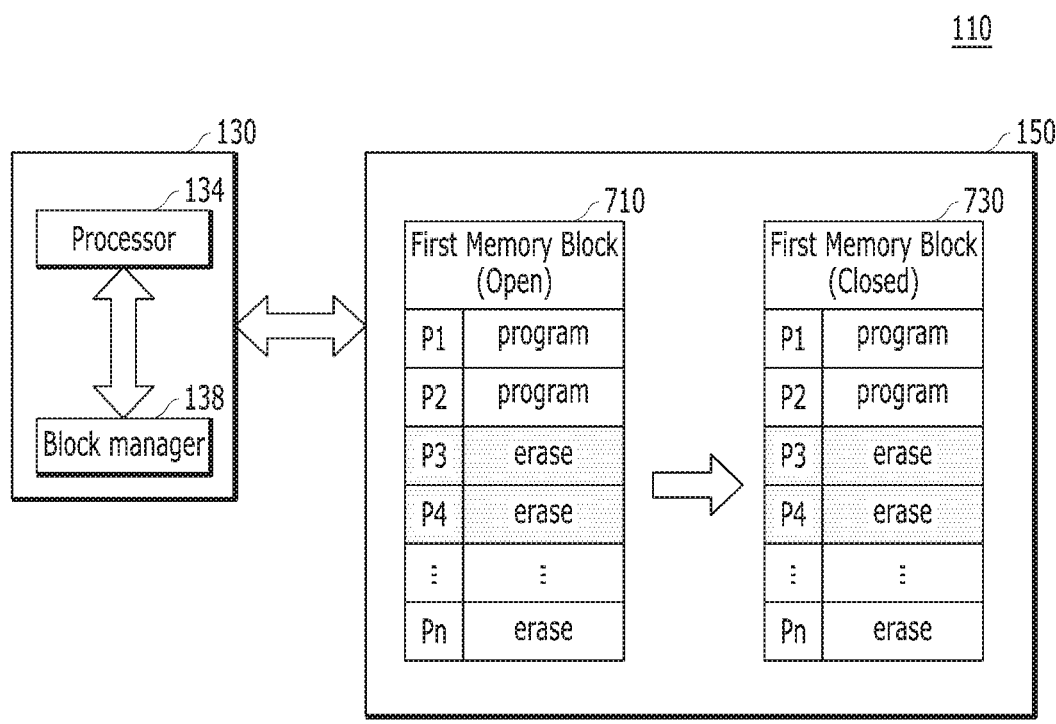
FIGS. 7A and 7B are diagrams illustrating an operation process of the memory system in accordance with an embodiment of the present invention.
Figure 7B:
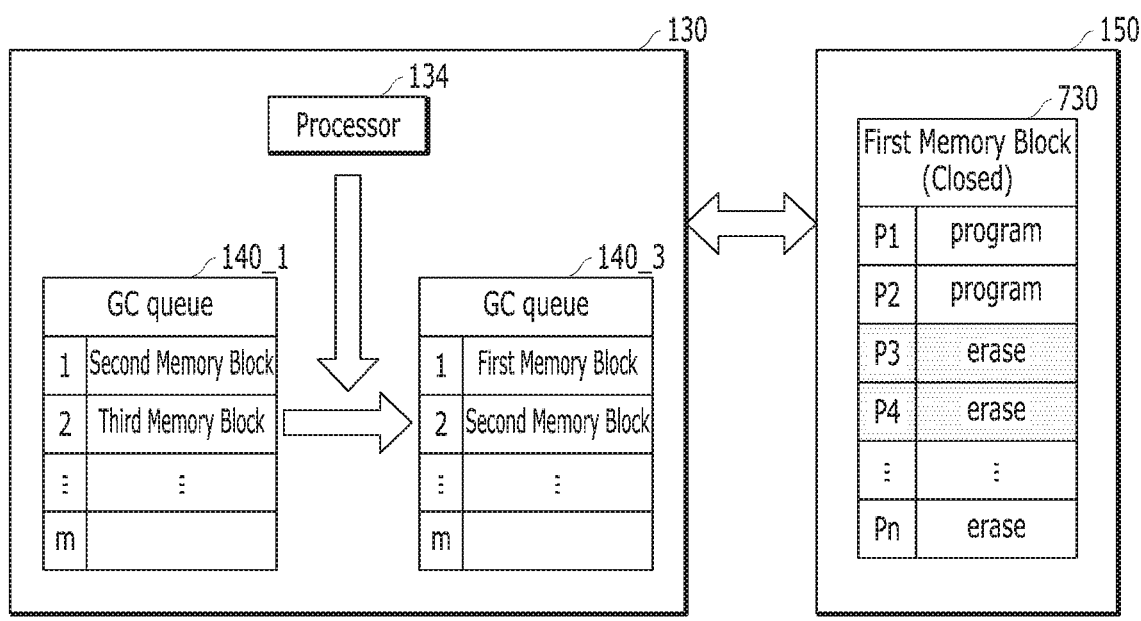

FIGS. 7A and 7B are diagrams illustrating an operation of the memory system 110 in accordance with an embodiment. Hereafter, as an example, the processor 134 switches an open memory block including one or more bad pages into a closed memory block. Furthermore, third and fourth pages P3 and P4 included in the first memory block 710 are bad pages. In reality, the memory device 150 may include a plurality of memory blocks. However, FIGS. 7A and 7B illustrate that the memory device 150 includes one memory block.

First, referring to FIG. 7A, when the memory system 110 is powered on, the processor 134 may load the boot code stored in the memory device 150 to perform the booting operation.

The processor 134 may control the block manager 138 to perform an operation of searching an open memory block, the operation being included in the booting operation. The block manager 138 may search one or more open memory blocks included in the memory device 150 under control of the processor 134. Furthermore, the block manager 138 may search an open first memory block 710.

The block manager 138 may detect a plurality of erase pages P3 to Pn included in the open first memory block 710. The block manager 138 may check an erase threshold voltage distribution corresponding to each of the erase pages P3 to Pn included in the open first memory block 710.

The block manager 138 may determine that the third and fourth pages P3 and P4 whose erase threshold voltage distributions are not normal are bad pages, according to the method described with reference to FIG. 6. The block manager 138 may count the number of bad pages included in the open first memory block 710 as '2'.

According to the above-described example, the block manager 138 may switch the open first memory block 710 into a closed first memory block 730, because the number of bad pages included in the open first memory block 710 is greater than '1'. Since the third to $n^{th}$ pages P3 to Pn of the open first memory block 710 are erase pages, the processor 134 may program data to the open first memory block 710. However, since the open first memory block 710 includes bad pages, the processor 134 may control the block manager 138 to switch the open first memory block 710 into the closed first memory block 730 in advance, in order to guarantee the stability of the data.

Referring to FIG. 7B, the processor 134 may perform a GC operation based on information of a plurality of memory blocks, queued in the GC queue 140_1, for example, address information.

However, when the open memory block (e.g., the first memory block 710) is switched into the closed memory block 730 for the stability of data during the booting operation as described with reference to FIG. 7A, the processor 134 may queue the information of the closed first memory block 730 in the GC queue 140_3. In particular, the processor 134 may preferentially queue the information of the closed first memory block 730 in the GC queue 140_3, in order to preferentially perform a GC operation for the closed first memory block 730.

The processor 134 may perform the GC operation based on the information of the closed first memory block 730, queued in the GC queue 140_3.

Figure 8A:
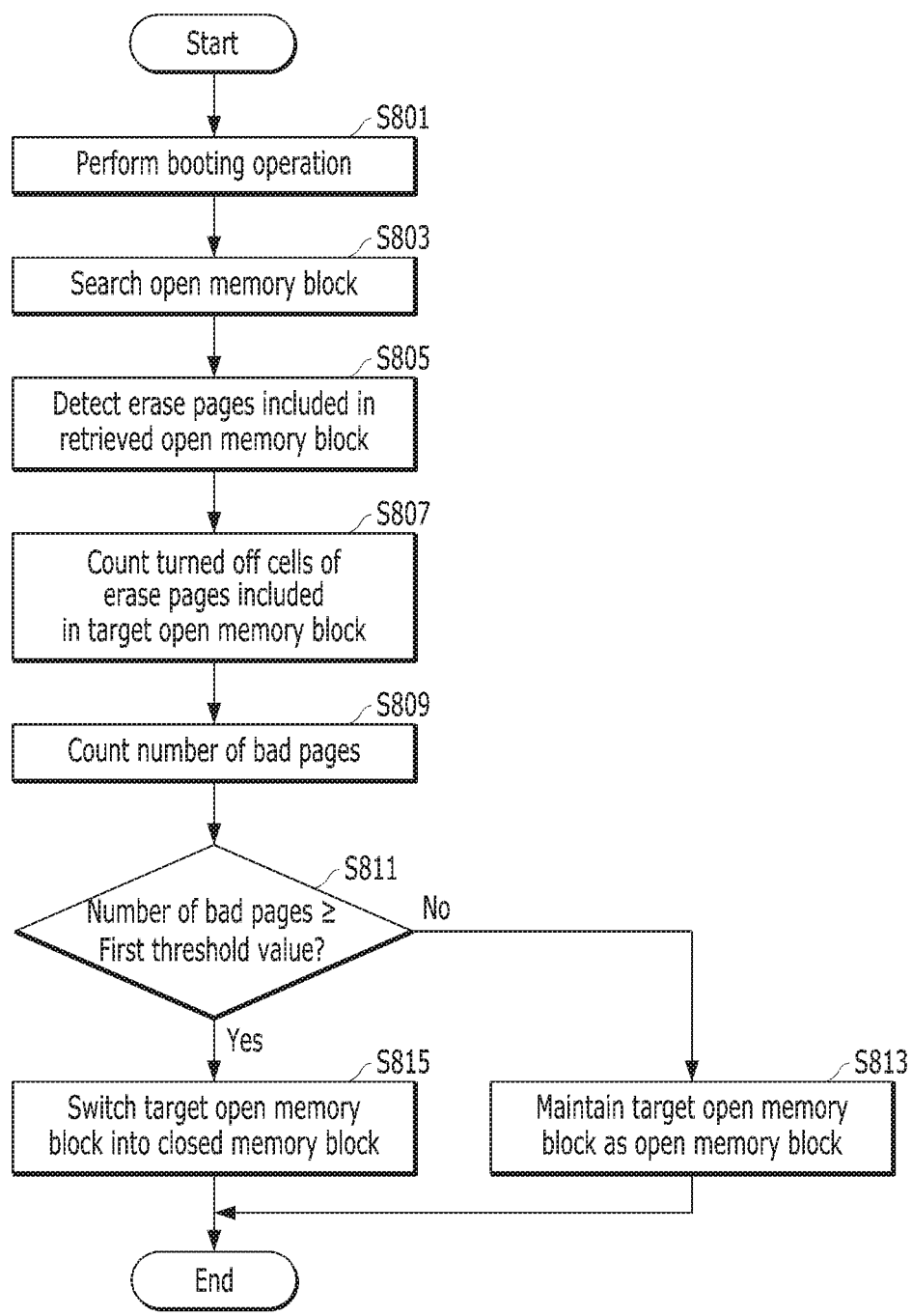
FIGS. 8A and 8B are flowcharts illustrating an operation process of the memory system in accordance with the present embodiment.
Figure 8B:
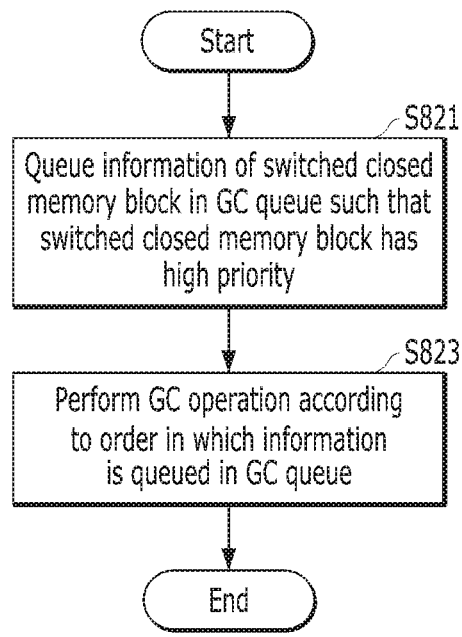

FIGS. 8A and 8B are flowcharts illustrating an operation of the memory system 110 in accordance with an embodiment.

In particular, FIG. 8A is a flowchart illustrating the operation process of the memory system 110 described with reference to FIG. 7A, and FIG. 8B is a flowchart illustrating the operation process of the memory system 110 described with reference to FIG. 7B.

Referring to FIG. 8A, when the memory system 110 is powered on, the processor 134 may load the boot code from the memory device 150 to perform the booting operation in step S801.

In step S803, the block manager 138 may search one or more open memory blocks included in the memory device 150 under control of the processor 134.

In step S805, the block manager 138 may detect one or more erase pages included in a target open memory block among the searched open memory block.

In step S807, the block manager 138 may count turned-off cells in each of the erase pages included in the target open memory block.

In step S809, the block manager 138 may count the number of bad pages whose erase threshold voltage distributions are not normal based on the number of turned-off cells counted in step S807.

In step S811, the block manager 138 may compare the number of bad pages to a first threshold value.

When the number of bad pages is less than the first threshold value ('No' in step S811), the block manager 138 may maintain the target open memory block as an open memory block in step S813.

On the other hand, when the number of bad pages is greater than or equal to the first threshold value ('Yes' in step S811), the block manager 138 may switch the target open memory block into a closed memory block in step S815.

Referring to FIG. 8B, the processor 134 may queue information (for example, address information) of the switched closed memory block (see step S815 of FIG. 8A) in the GC queue 140 in step S821. In particular, the processor 134 may queue the information of the switched closed memory block in the GC queue 140 such that the switched closed memory block has a high priority.

In step S823, the processor 134 may perform GC operations according to the order in which the information is queued in the GC queue 140. When the information of the switched closed memory block was preferentially queued in the GC queue 140, the processor 134 may first perform a GC operation on the switched closed memory block.

Figure 9:
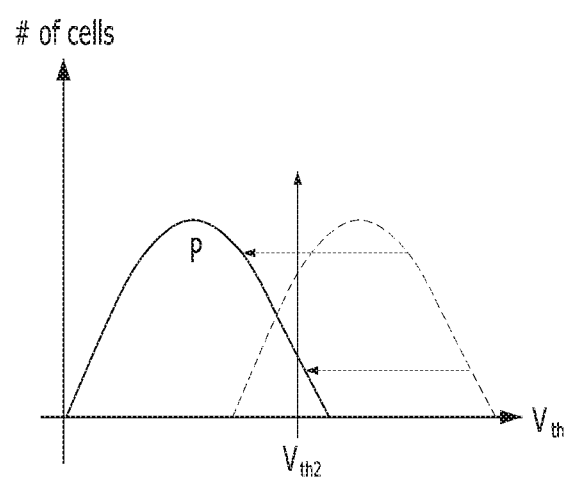
FIG. 9 is a threshold voltage distribution graph indicating a program threshold voltage distribution which may be deformed due to characteristic deterioration of an SLC nonvolatile memory device.

FIG. 9 is a threshold voltage distribution graph indicating a program threshold voltage distribution which may be deformed due to characteristic deterioration of an SLC nonvolatile memory device. Hereafter, as an example, a page in which a number of turned-off cells read with a specific read voltage is less than a predetermined threshold value is a bad page. The predetermined threshold value may be set by a designer.

A charge loss may occur in the memory device 150. Specifically, as time elapses, electrons trapped in a floating gate or tunnel oxide may be discharged. When the tunnel oxide deteriorates as program and erase operations are repeated, the charge loss may become more serious. The charge loss may reduce the threshold voltages. As a result, the program threshold voltage distribution may be shifted to the left as illustrated in FIG. 9.

Referring to FIG. 9, when the processor 134 reads a target page having the ideal program threshold voltage distribution (dotted line) with a second read voltage $V_{th2}$, memory cells having threshold voltages lower than the second read voltage $V_{th2}$ may be turned-on, and memory cells having threshold voltages greater than or equal to the second read voltage $V_{th2}$ may be turned-off. When the processor 134 reads a target page having a program threshold voltage distribution (solid line) shifted to the left from the ideal program threshold voltage distribution due to characteristic deterioration (for example, charge loss) of the memory device 150 with the second read voltage $V_{th2}$, the number of the turned-off cells may decrease. When the number of the turned-off cells is less than a predetermined threshold value, the block manager 138 may determine that the program threshold voltage distribution (solid line) is not normal. That is, when the number of the turned-off cells is less than the predetermined threshold value, the block manager 138 may determine that the page is a bad page.

Figure 10A:
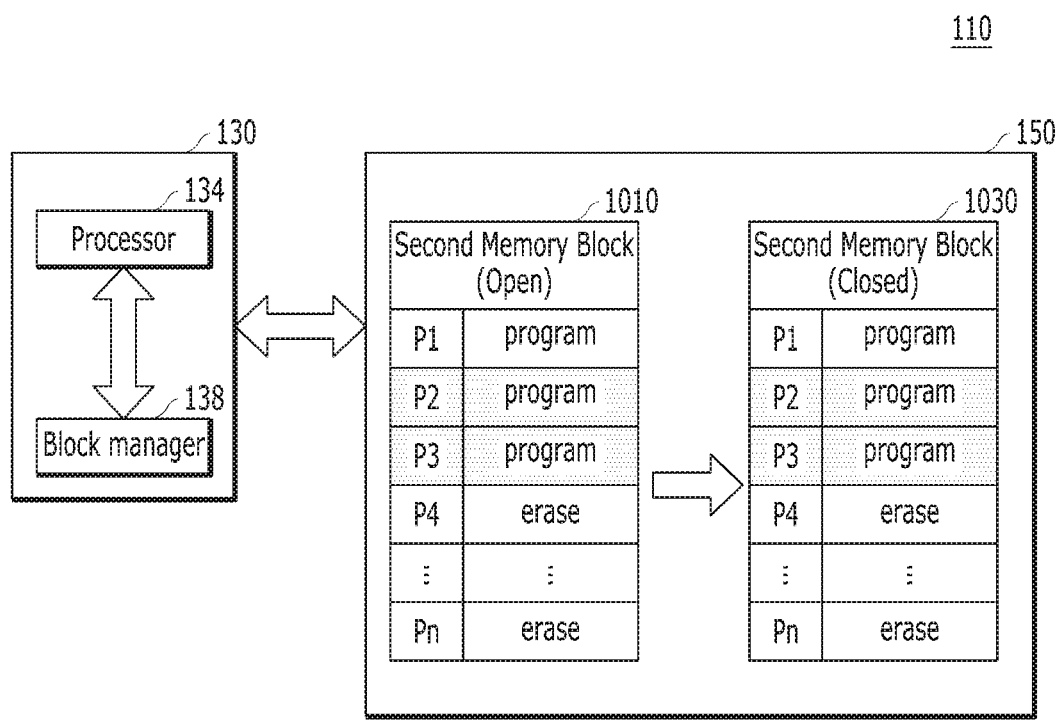
FIGS. 10A and 10B are diagrams illustrating an operation process of the memory system in accordance with an embodiment of the present invention.
Figure 10B:
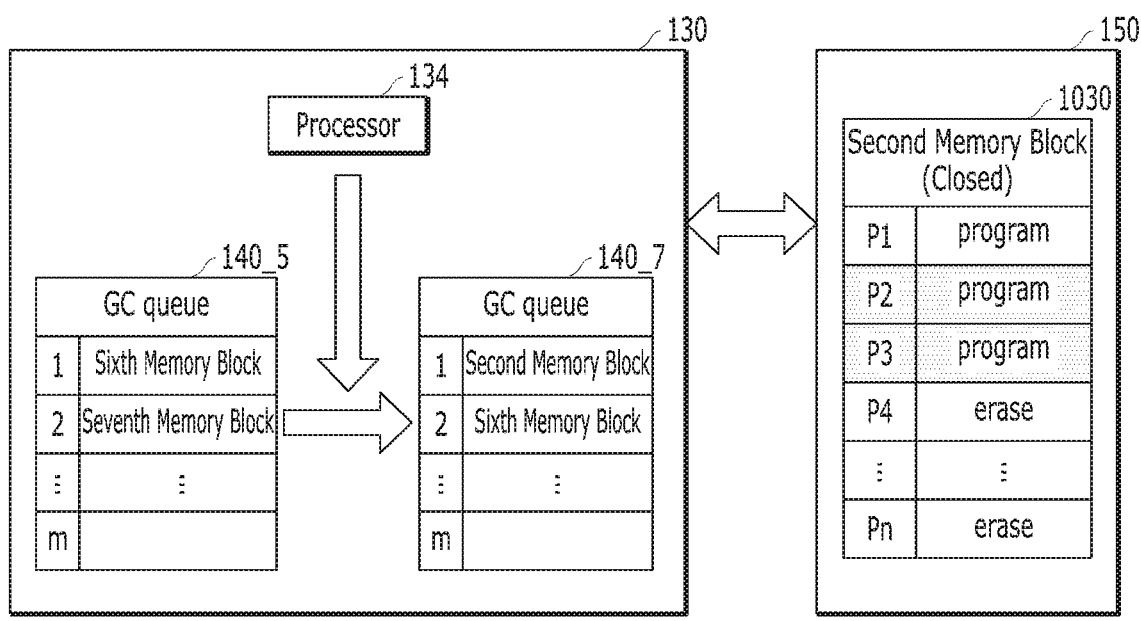

FIGS. 10A and 10B are diagrams illustrating an operation of the memory system in accordance with an embodiment. Hereafter, as an example, the processor 134 switches an open memory block including one or more bad pages into a closed memory block. Furthermore, as an example, second and third pages P2 and P3 included in a second memory block 1010 are bad pages. In reality, the memory device 150 may include a plurality of memory blocks. However, FIGS. 10A and 10B illustrate that the memory device 150 includes one memory block.

Referring to FIG. 10A, when the memory system 110 is powered on, the processor 134 may load the boot code stored in the memory device 150 to perform the booting operation.

The processor 134 may control the block manager 138 to perform an operation of searching an open memory block, the operation being included in the booting operation. The block manager 138 may search one or more open memory blocks included in the memory device 150 under control of the processor 134. Furthermore, the block manager 138 may search an open second memory block 1010.

The block manager 138 may read a plurality of program pages P1 to P3 separately from an operation of detecting a plurality of erase pages P4 to Pn included in the open second memory block 1010. The block manager 138 may check a program threshold voltage distribution corresponding to each of the program pages P1 to P3 included in the open second memory block 1010.

The block manager 138 may determine that the second and third pages P2 and P3 whose program threshold voltage distributions are not normal are bad pages, according to the method described with reference to FIG. 9. The block manager 138 may count the number of bad pages included in the open second memory block 1010 as '2'.

According to the above-described example, the block manager 138 may switch the open second memory block 1010 into a closed second memory block 1030 because the number of bad pages included in the open second memory block 1010 is greater than '1'. Since the fourth to $n^{th}$ pages P4 to Pn of the open second memory block 1010 are erase pages, the processor 134 may program data to the open second memory block 1010. However, since the open second memory block 1010 includes bad pages, the processor 134 may control the block manager 138 to switch the open second memory block 1010 into the closed second memory block 1030 in advance, in order to guarantee the stability of the data.

Referring to FIG. 10B, the processor 134 may perform GC operations based on information of a plurality of memory blocks, queued in the GC queue 140_5, for example, address information.

However, when the open memory block (e.g., the second memory block 1010) is switched into the closed memory block 1030 for the stability of the data during the booting operation as described with reference with FIG. 10A, the processor 134 may queue the information of the closed second memory block 1030 in the GC queue 140_7. In particular, the processor 134 may preferentially queue the information of the second memory block 1030 in the GC queue 140_7, in order to preferentially perform the GC operation for the closed second memory block 1030.

The processor 134 may perform a GC operation based on the information of the closed second memory block 1030, which is queued in the GC queue 140_7.

Figure 11A:
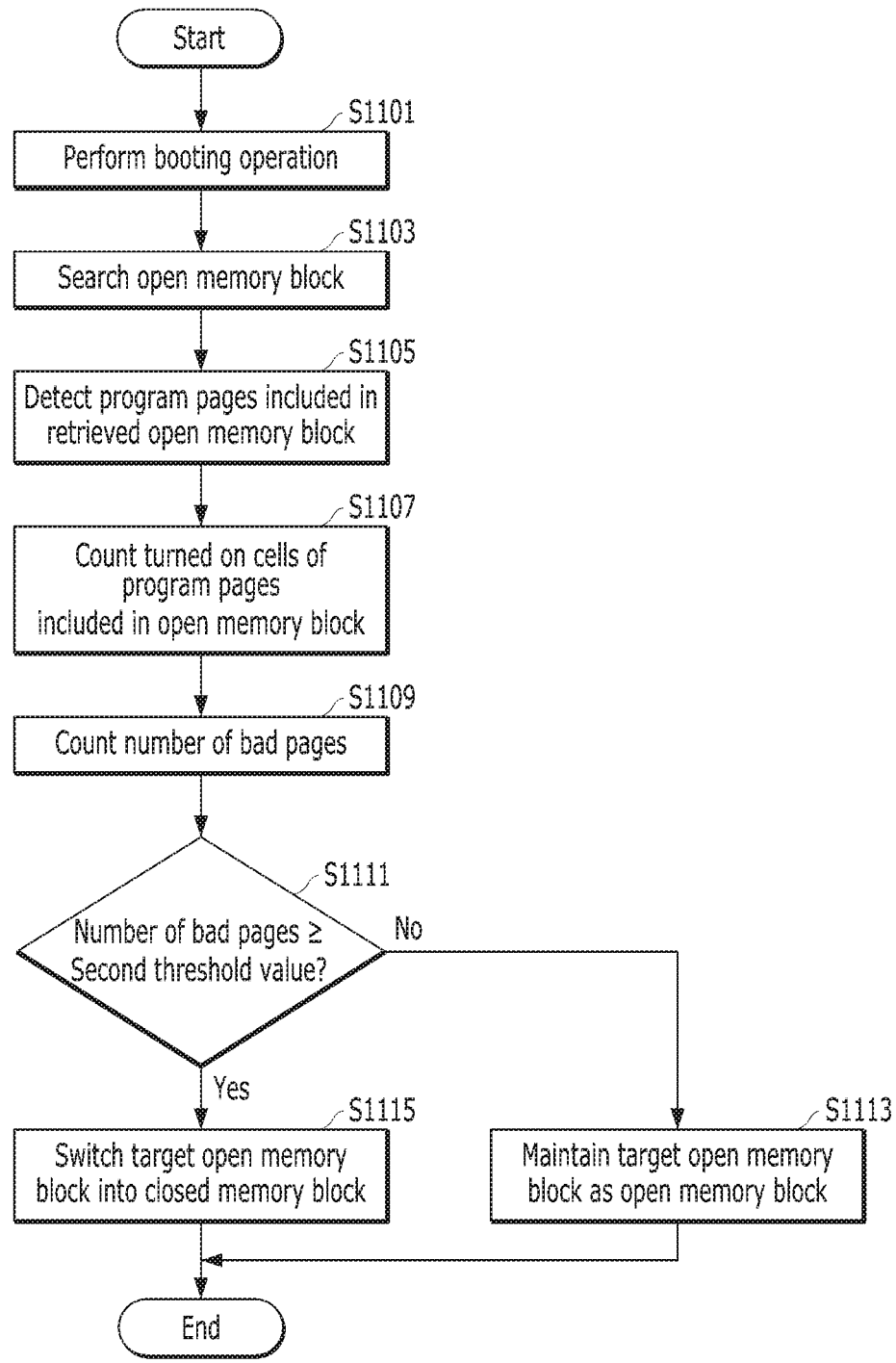
FIGS. 11A and 11B are flowcharts illustrating an operation process of the memory system in accordance with the present embodiment.
Figure 11B:
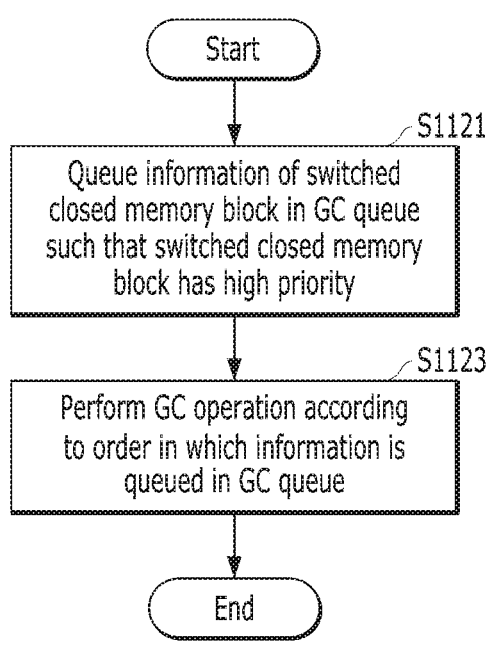

FIGS. 11A and 11B are flowcharts illustrating an operation of the memory system 110 in accordance with an embodiment.

In particular, FIG. 11A is a flowchart illustrating the operation process of the memory system 110 described with reference to FIG. 10A, and FIG. 11B is a flowchart illustrating the operation process of the memory system 110 described with reference to FIG. 10B.

Referring to FIG. 11A, when the memory system 110 is powered on, the processor 134 may load the boot code from the memory device 150 to perform the booting operation in step S1101.

In step S1103, the block manager 138 may search one or more open memory blocks included in the memory device 150 under control of the processor 134.

In step S1105, the block manager 138 may detect one or more program pages included in a target open memory block among the searched open memory block.

In step S1107, the block manager 138 may count turned-on cells in each of the program pages included in the target open memory block.

In step S1109, the block manager 138 may count the number of bad pages whose program threshold voltage distributions are not normal based on the number of turned-on cells counted in step S1107.

In step S1111, the block manager 138 may compare the number of bad pages to a second threshold value.

When the number of bad pages is less than the second threshold value ('No' in step S1111), the block manager 138 may maintain the target open memory block as an open memory block in step S1113.

On the other hand, when the number of bad pages is greater than or equal to the second threshold value ('Yes' in step S1111), the block manager 138 may switch the target open memory block into a closed memory block in step S1115.

Referring to FIG. 11B, the processor 134 may queue information (for example, address information) of the switched closed memory block (see step S1115 of FIG. 11A) in the GC queue 140 in step S1121. In particular, the processor 134 may queue the information of the switched closed memory block in the GC queue 140 such that the information has a high priority.

In step S1123, the processor 134 may perform GC operations according to the order in which the information is queued in the GC queue 140. When the information of the switched closed memory block was preferentially queued in the GC queue 140, the processor 134 may first perform a GC operation on the switched closed memory block.

As such, the memory system 110 in accordance with the present embodiment may check characteristic deterioration of the memory device 150 (for example, disturbance or charge loss) without an additional operation, by utilizing a read operation for program pages or erase pages of an open memory block, which is performed during a booting operation. Furthermore, the memory system 110 may perform a GC operation on a memory block of which the characteristic deterioration has progressed, thereby improving the reliability of data.

Hereinbelow, detailed descriptions will be made with reference to FIGS. 12 to 20, for a data processing system and electronic appliances to which the memory system 110 including the memory device 150 and the controller 130 described above with reference to FIGS. 1 to 11, in accordance with the embodiment of the disclosure, is applied.

Figure 12:
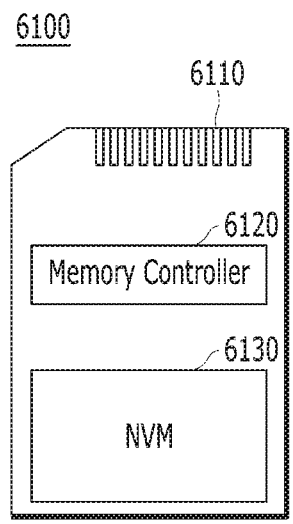
FIGS. 12 to 20 are diagrams illustrating applications of a data processing system in accordance with various embodiments of the present invention.

FIG. 12 is a diagram illustrating another example of a data processing system including a memory system in accordance with an embodiment. For example, FIG. 12 illustrates a memory card system 6100 to which the memory system may be applied.

Referring to FIG. 12, the memory card system 6100 may include a memory controller 6120, a memory device 6130 and a connector 6110.

More specifically, the memory controller 6120 may be electrically connected to, and configured to access, the memory device 6130 embodied by a nonvolatile memory (NVM). For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a random access memory (RAM), a processor, a host interface, a memory interface and an error correction component.

The memory controller 6120 may communicate with an external device, for example, the host 102 of FIG. 1 through the connector 6110. For example, as described with reference to FIG. the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), advanced technology attachment (ATA), serial-ATA, parallel-ATA, small computer system interface (SCSI), enhanced small disk interface (EDSI), integrated drive electronics (IDE), Firewire, universal flash storage (UFS), wireless fidelity (Wi-Fi or WiFi) and Bluetooth. Thus, the memory system and the data processing system in accordance with the present embodiment may be applied to wired/wireless electronic devices or specific mobile electronic devices.

The memory device 6130 may be implemented by a nonvolatile memory (NVM). For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be so integrated to form a memory card such as a PC card (personal computer memory card international association (PCMCIA)), a compact flash (CF) card, a smart media card (e.g., a SM and a SMC), a memory stick, a multimedia card (e.g., a MMC, a RS-MMC, a MMCmicro and an eMMC), a secure digital (SD) card (e.g., a SD, a miniSD, a microSD and a SDHC), and/or a universal flash storage (UFS), FIG. 13 is a diagram illustrating another example of a data processing system 6200 including a memory system in accordance with an embodiment.

Figure 13:
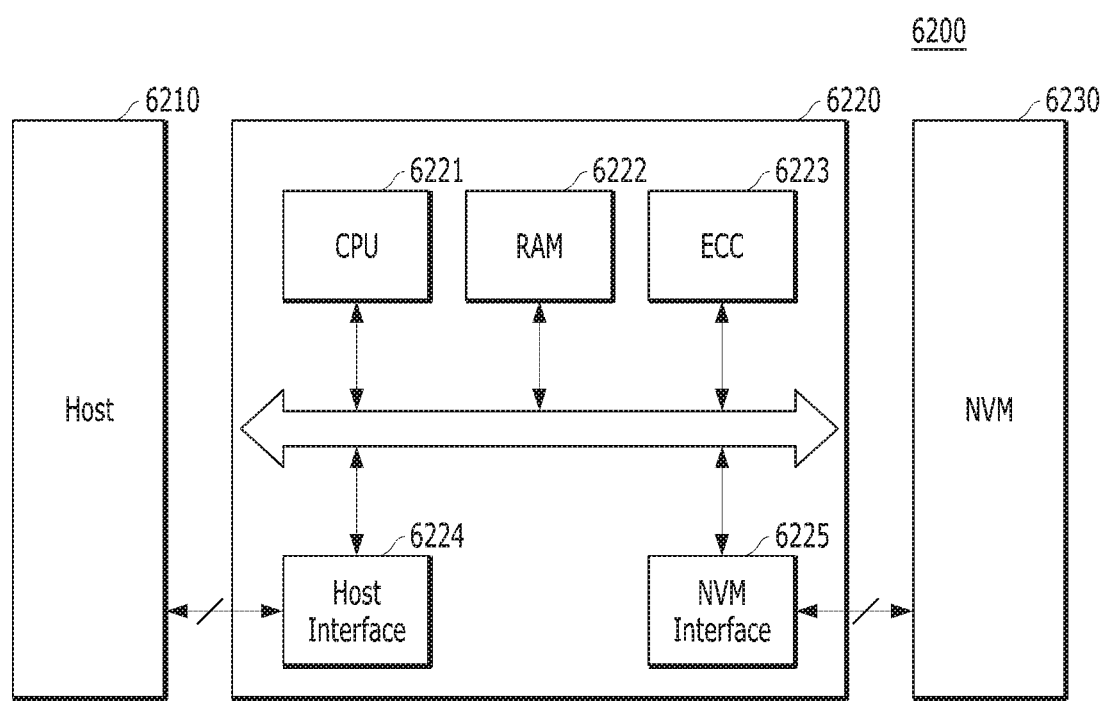

Referring to FIG. 13, the data processing system 6200 may include a memory device 6230 having one or more nonvolatile memories (NVMs) and a memory controller 6220 for controlling the memory device 6230. The data processing system 6200 illustrated in FIG. 13 may serve as a storage medium such as a memory card (e.g., CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more central processing units (CPUs) 6221, a buffer memory such as a random access memory (RAM) 6222, an error correction code (ECC) circuit 6223, a host interface 6224 and a memory interface such as a nonvolatile memory (NVM) interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may generate an error correction code (ECC) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. The ECC circuit 6223 may correct an error using the low density parity check (LDDC) code, Bose-Chaudhri-Hocquenghem (BCH) code, turbo code, Reed-Solomon (RS) code, convolution code, recursive systematic code (RSC) or coded modulation such as trellis coded modulation (TCM) or block coded modulation (BCM).

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a parallel advanced technology attachment (PATA) bus, a serial advanced technology attachment (SATA) bus, a small computer system interface (SCSI), a universal serial bus (USB), a peripheral component interconnect-express (PCIe) or a NAND interface. The memory controller 6220 may have a wireless communication function with a mobile communication protocol such as wireless fidelity (WiFi) or long term evolution (LTE). The memory controller 6220 may be connected to an external device, for example, the host 6210 or another external device, and then transmit/receive data to/from the external device. In particular, as the memory controller 6220 is configured to communicate with the external device according to one or more of various communication protocols, the memory system and the data processing system in accordance with an embodiment may be applied to wired/wireless electronic devices, particularly a mobile electronic device.

Figure 14:
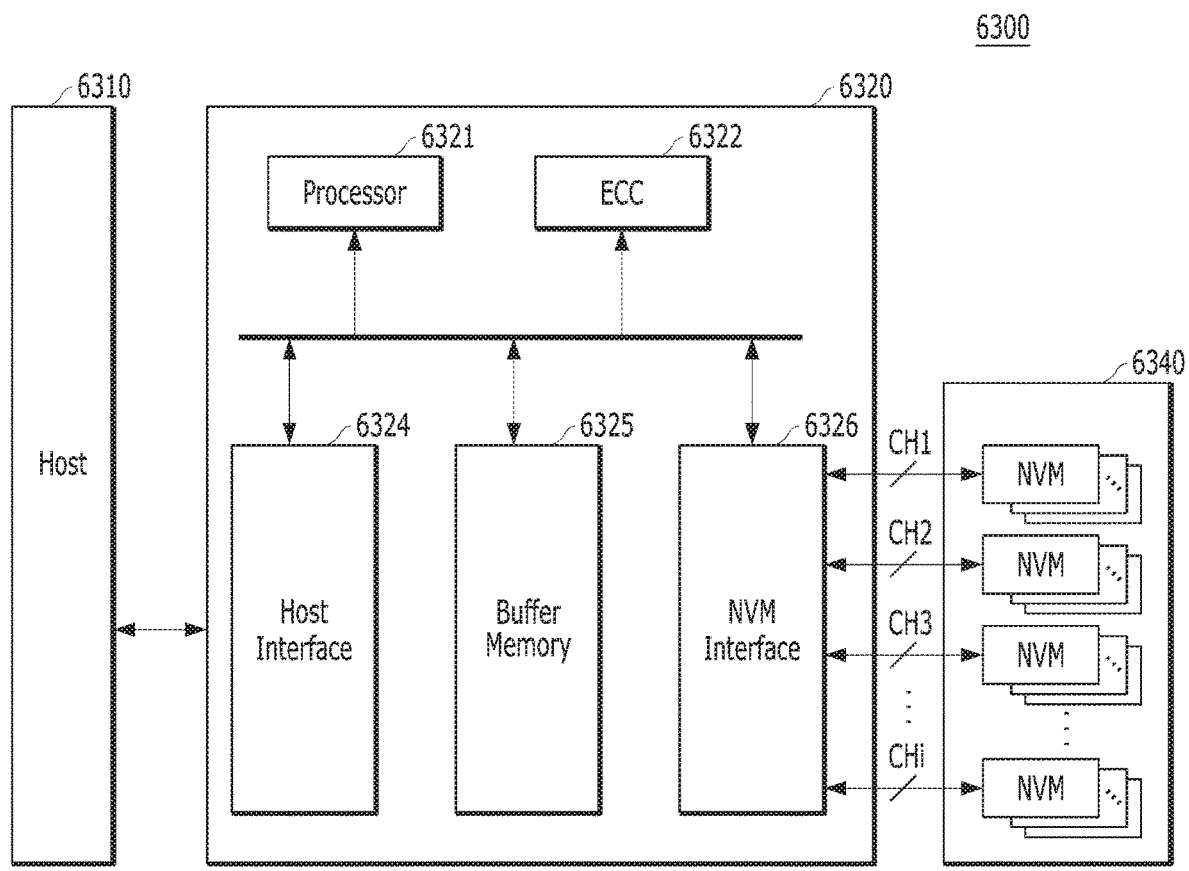

FIG. 14 is a diagram illustrating another example of a data processing system including a memory system in accordance with an embodiment. For example, FIG. 14 illustrates a solid state drive (SSD) 6300 to which the memory system may be applied.

Referring to FIG. 14, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a dynamic random access memory (DRAM), a synchronous DRAM (SDRAM), a double data rate (DDR) SDRAM, a low power DDR (LPDDR) SDRAM and a graphics RAM (GRAM) or nonvolatile memories such as a ferroelectric RAM (FRAM), a resistive RAM (RRAM or ReRAM), a spin-transfer torque magnetic RAM (STT-MRAM) and a phase-change RAM (PRAM). FIG. 14 illustrates that the buffer memory 6325 is embodied in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 15:
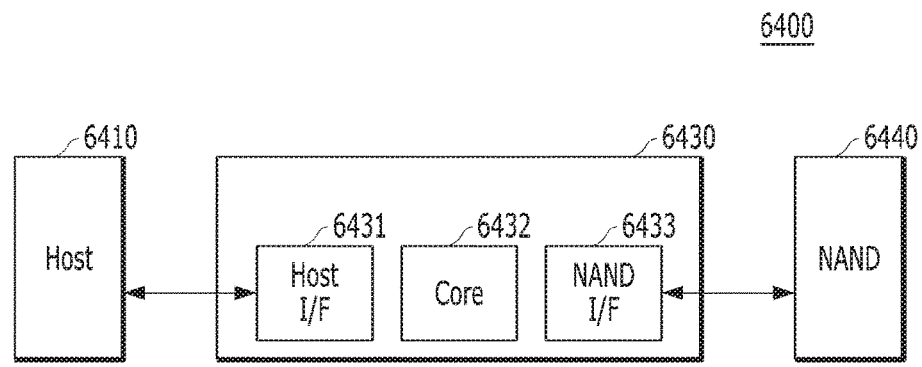

FIG. 15 is a diagram illustrating another example of a data processing system including a memory system in accordance with an embodiment. For example, FIG. 15 illustrates an embedded multi-media card (eMMC) 6400 to which the memory system may be applied.

Referring to FIG. 15, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, ultra high speed (UHS)-I/UHS-II) interface.

FIGS. 16 to 19 are diagrams illustrating other examples of a data processing system including a memory system in accordance with embodiments. For example, FIGS. 16 to 19 illustrate universal flash storage (UFS) systems to which the memory system may be applied.

Referring to FIGS. 16 to 19, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 13 to 15, and the UFS cards 6530, 6630, 6730, 6830 may be embodied in the form of the memory card system 6100 described with reference to FIG. 12.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI unified protocol (UniPro) in mobile industry processor interface (MIPI). Furthermore, the UFS devices 6520, 6620, 6720, 6820 and the UFS cards 6530, 6630, 6730, 6830 may communicate with each other through any of various protocols other than the UFS protocol, for example, universal storage bus (USB) Flash Drives (UFDs), a multi-media card (MMC), a secure digital (SD), a mini-SD, and a micro-SD.

Figure 16:
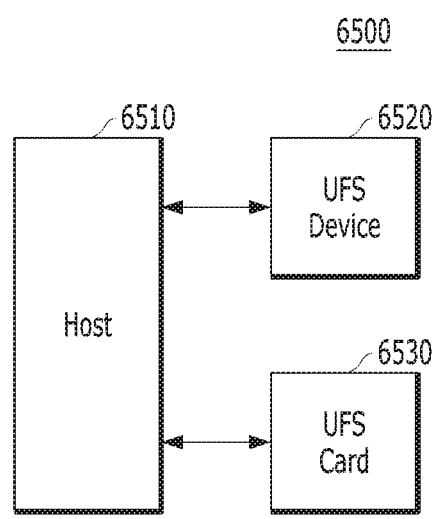

In the UFS system 6500 illustrated in FIG. 16, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 17:
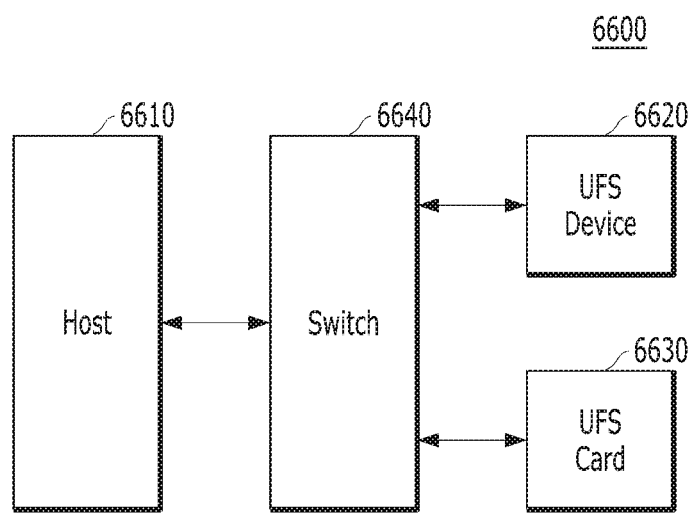

In the UFS system 6600 illustrated in FIG. 17, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 18:
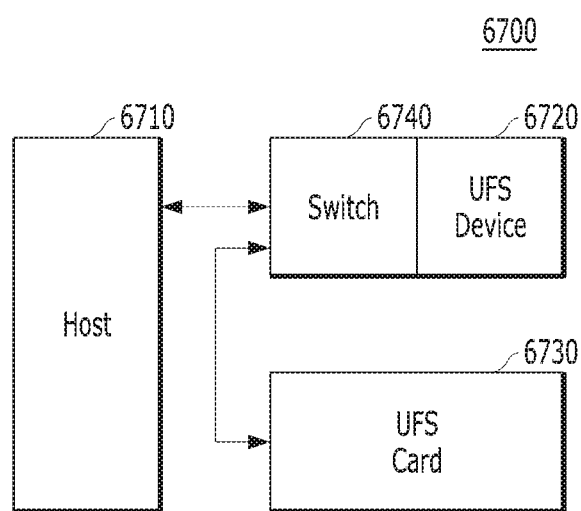

In the UFS system 6700 illustrated in FIG. 18, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 19:
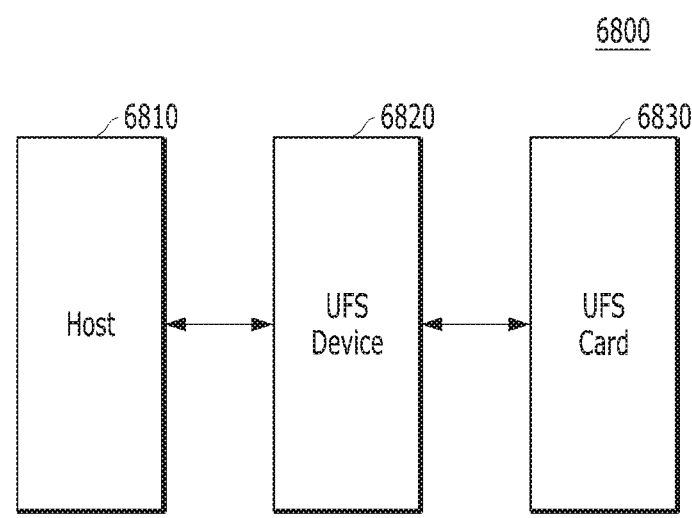

In the UFS system 6800 illustrated in FIG. 19, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 20:
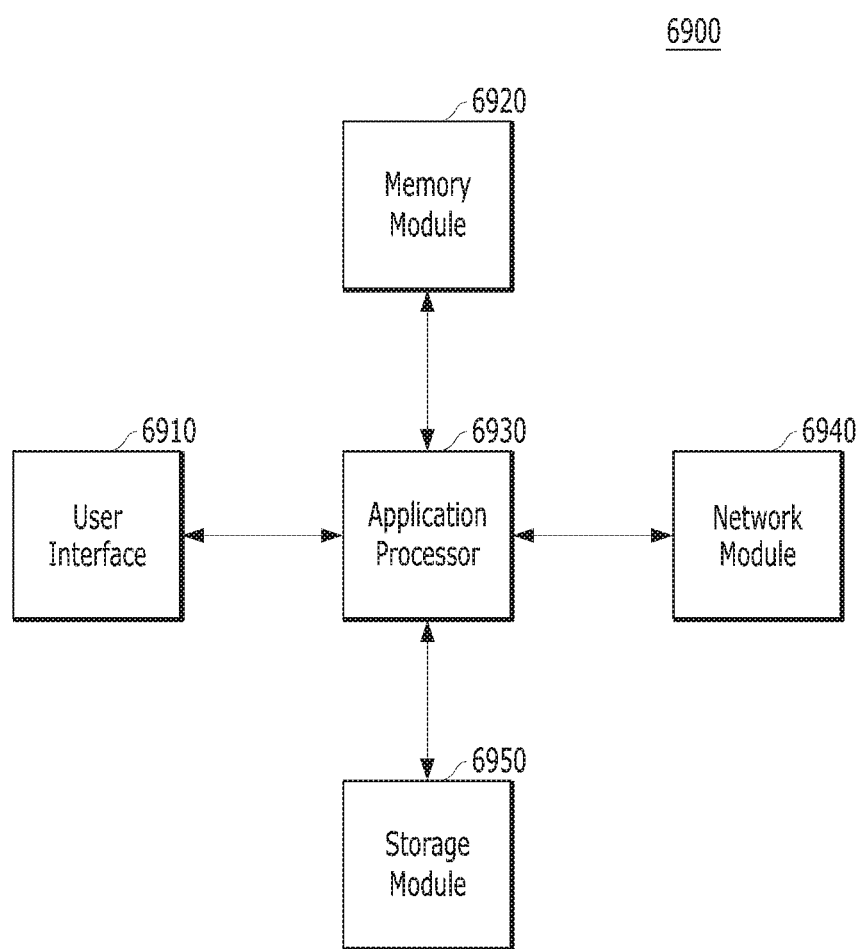

FIG. 20 is a diagram illustrating another example of a data processing system including a memory system in accordance with an embodiment of the present invention. For example, FIG. 20 is a diagram illustrating a user system 6900 to which the memory system may be applied.

Referring to FIG. 20, the user system 6900 may include a user interface 6910, a memory module 6920, an application processor 6930, a network module 6940 and a storage module 6950.

More specifically, the application processor 6930 may drive components in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, a DDR2 SDRAM, a DDR3 SDRAM, a low power DDR (LPDDR) SDARM, a LPDDR3 SDRAM or a LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on package on package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 14 to 19.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments, the memory system may efficiently manage memory block, thereby improving the reliability of the data stored in the memory device.

While the present invention has been described with respect to the specific embodiments, it will be apparent to those skilled in the art that various changes and modifications may be made without departing from the spirit and scope of the invention as defined in the following claims.

What is claimed is:

1. An operating method of a memory system which includes a memory device and a controller for controlling the memory device, the operating method comprising:
    searching one or more open memory blocks included in the memory device when a booting operation is performed;
    detecting one or more erase pages included in each of the open memory blocks;
    checking an erase threshold voltage distribution corresponding to each of the erase pages;
    counting a number of first bad pages among the erased pages based on the erase threshold voltage distribution; and
    switching a first open memory block including the first bad pages among the open memory blocks into a first closed memory block when the number of first bad pages is equal to or greater than a first threshold value.

2. The operating method of claim 1, further comprising:
    queuing information of the first closed memory block in a garbage collection (GC) queue; and
    performing a GC operation on the first closed memory block according to an order in which the information of the first closed memory block is queued in the GC queue.

3. The operating method of claim 2, wherein the queuing of the information of the first closed memory block comprises queuing the information of the first closed memory block in the GC queue such that the first closed memory block is preferentially processed.

4. The operating method of claim 1, further comprising:
    detecting one or more program pages included in each of the open memory blocks;
    checking a program threshold voltage distribution corresponding to each of the program pages;
    counting a number of second bad pages among the program pages based on the program threshold voltage distribution; and
    switching a second open memory block including the second bad pages among the open memory blocks into a second closed memory block when the number of second bad pages is greater than or equal to a second threshold value.

5. The operating method of claim 4, further comprising:
    queuing information of the second closed memory block in the GC queue; and
    performing a GC operation on the second closed memory block according to an order in which the information of the second closed memory block is queued in the GC queue.

6. The operating method of claim 5, wherein the queuing of the information of the second closed memory block comprises queuing the information of the second closed memory block in the GC queue, such that the second closed memory block is preferentially processed.

7. The operating method of claim 4,
    wherein the program pages within each of the open memory blocks are detected according to read biases respectively for the program pages, and
    wherein each of the second bad pages has a lesser number of turned-off cells than a fourth threshold value according to a corresponding one among the read biases.

8. The operating method of claim 1,
    wherein the erased pages within each of the open memory blocks are detected according to read biases respectively for the erased pages, and
    wherein each of the first bad pages has a greater number of turned-off cells than a third threshold value according to a corresponding one among the read biases.

9. A memory system comprising:
    a memory device; and
    a controller suitable for:
    searching one or more open memory blocks during a booting operation;
    detecting one or more erase pages included in each of the open memory blocks;
    checking an erase threshold voltage distribution corresponding to each of the erase pages;
    counting a number of first bad pages among the erased pages based on the erase threshold voltage distribution; and
    switching a first open memory block including the first bad pages among the open memory blocks into a first closed memory block when the number of first bad pages is greater than or equal to a first threshold value.

10. The memory system of claim 9, wherein the controller comprises:
    a block manager suitable for performing the searching, the detecting, the checking, the counting and the switching; and
    a processor suitable for controlling the block manager.

11. The memory system of claim 10,
wherein the controller further comprises a GC queue suitable for queuing information of a memory block on which a GC operation is to be performed,
wherein the processor queues information of the first closed memory block in the GC queue, and performs the GC operation on the first closed memory block according to an order in which the information is queued in the GC queue.

12. The memory system of claim 11, wherein the processor queues the information of the first closed memory block in the GC queue such that the first closed memory block is preferentially processed.

13. The memory system of claim 10, wherein the block manager is further suitable for:
detecting one or more program pages included in each of the open memory blocks;
checking a program threshold voltage distribution corresponding to each of the program pages;
counting a number of second bad pages among the program pages based on the program threshold voltage distribution; and
switching a second open memory block including the second bad pages among the open memory blocks into a second closed memory block when the number of second bad pages is larger than or equal to a second threshold value.

14. The memory system of claim 13, wherein the processor further queues information of the second closed memory block in the GC queue, and performs the GC operation on the second closed memory block according to an order in which the information of the second closed memory block is queued in the GC queue.

15. The memory system of claim 14, wherein the processor queues the information of the second closed memory block in the GC queue such that the second closed memory block is preferentially processed.

16. The memory system of claim 13,
wherein the block manager detects the program pages within each of the open memory blocks according to read biases respectively for the program pages, and
wherein each of the second bad pages has a lesser number of turned-off cells than a fourth threshold value according to a corresponding one among the read biases.

17. The memory system of claim 10,
wherein the block manager detects the erased pages within each of the open memory blocks according to read biases respectively for the erased pages, and
wherein each of the first bad pages has a greater number of turned-off cells than a third threshold value according to a corresponding one among the read biases.

18. An operating method of a controller, the operating method comprising:
counting, when detecting one or more erased pages included in a memory block of a memory device with read biases respectively corresponding to the erased pages while booting thereof, a number of turned-off cells within each of the erased pages; and
controlling the memory device to perform a garbage collection operation to the memory block when a number of bad pages, each of which has a greater number of turned-off cells than a first threshold among the erased pages, is greater than a second threshold.

\* \* \* \* \*